US006410629B1

(12) United States Patent
Mullins et al.

(10) Patent No.: US 6,410,629 B1
(45) Date of Patent: Jun. 25, 2002

(54) INCORPORATION OF FREE RADICAL INHIBITORS IN POLYOLEFINS

(75) Inventors: Michael J. Mullins, Lake Jackson, TX (US); Peter N. Nickias; Jorge Soto, both of Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 08/920,625

(22) Filed: Aug. 27, 1997

Related U.S. Application Data
(60) Provisional application No. 60/025,430, filed on Sep. 4, 1996.

(51) Int. Cl.⁷ ................................................. C08K 5/51
(52) U.S. Cl. ...................................... 524/351; 524/353
(58) Field of Search .......................... 524/351, 353; 526/134

(56) References Cited

U.S. PATENT DOCUMENTS

| | | | |
|---|---|---|---|
| 3,477,991 A | 11/1969 | Patton et al. | 260/47 |
| 4,170,589 A | 10/1979 | Goeke et al. | 260/45.95 |
| 4,521,566 A | 6/1985 | Galli et al. | 525/247 |
| 4,853,426 A | 8/1989 | Chatterjee | 524/100 |
| 5,017,727 A | 5/1991 | Olivier | 568/719 |
| 5,064,878 A | 11/1991 | Chatterjee | 523/205 |
| 5,077,327 A | 12/1991 | Cecchin et al. | 524/68 |
| 5,157,164 A | 10/1992 | Olivier | 568/719 |
| 5,278,210 A * | 1/1994 | Morini et al. | 524/351 |
| 5,294,679 A | 3/1994 | Sivak et al. | 525/326.5 |
| 5,296,562 A | 3/1994 | Sivak et al. | 525/367 |
| 5,296,626 A | 3/1994 | Sivak et al. | 556/482 |
| 5,329,037 A | 7/1994 | Sivak et al. | 556/464 |
| 5,336,745 A | 8/1994 | Cheradame et al. | 526/347.1 |
| 5,350,786 A | 9/1994 | Costanzi et al. | 524/102 |
| 5,367,090 A | 11/1994 | Sivak et al. | 556/443 |
| 5,373,061 A | 12/1994 | Sivak et al. | 525/326.5 |
| 5,416,177 A * | 5/1995 | Siedle et al. | 526/134 |
| 5,444,125 A | 8/1995 | Tomita et al. | 515/293 |
| 5,527,752 A * | 6/1996 | Reichle et al. | 526/160 |
| 5,547,675 A | 8/1996 | Canich | 502/117 |
| 5,753,785 A * | 5/1998 | Reddy et al. | 526/153 |

FOREIGN PATENT DOCUMENTS

| | | | | |
|---|---|---|---|---|
| DE | 1 947 590 | | 4/1970 | C06I/19/00 |
| DE | 0 703 249 A1 | | 3/1996 | C08F/30/08 |
| DE | 44 33 481 A1 | | 3/1996 | C08F/30/08 |
| EP | 0 003 836 A1 | | 9/1979 | C08F/10/02 |
| EP | 0 363 990 | | 4/1990 | C08F/230/08 |
| EP | 0 755 948 A2 | | 6/1996 | C08F/2/44 |
| EP | 0 781 783 A1 | | 12/1996 | C08F/4/629 |
| JP | 43-15823 | | 8/1964 | |
| WO | 88/08856 | | 11/1988 | C08F/30/08 |

OTHER PUBLICATIONS

Derwent Publication No. 86–115514/18.
Chemical Abstract No. 116:60229e.
Chemical Abstract No. 117:251999m.
Chemical Abstract No. 119:250729c.
Chemical Abstract No.121:206273x.
Derwent Publication No. 94–221995/27.
Chemical Abstract No. 96;124006h.
Chemical Abstract No. 118:102560e.
Wilen et al., "Copolymerization of propylene and 4–(ωalkenyl)–2,6–di–t–butylphenol over a supported high activity Ziegler–Natta catalyst", Polymer 1992, No. 23, pp. 5049–5055.
Wilen et al., "Polar Activation in Copolymerization of Propylene and 6–tert–Butyl–2–(1, 1–dimethylhept–6–enyl)–4–methylphenol over a Racemic [1,1'–(Dimethylsilylene) bis ($\eta^5$–4,5,6, 7–tetrahydro–1–indenyl)] zirconium Dichloride/Methylalumoxane Catalyst System", Macromolecules 1994, No. 27, pp. 4051–4057.
Young et al., "Preparation of Ethylene–Propylene Copolymers and EPDM Containing a Polymerizable Antioxidant", ACS Polymer Preprints, vol. 33, No. 1, 1992, p. 966.
Wilen et al., "Copolymerization of Ethylene and 6–tert–Butyl–2–(1, 1–dimethylhept–6–enyl)–4–methylphenol over Three Different Metallocene–Alumoxane Catalyst Systems", Macromolecules, vol. 29, No. 27, 1996, pp. 8569–8575.
Search Report #8694.
Srinivass et al., "Role of Trimethylaluminum on the Zirconocene–Methylaluminoxane–Catalyzed Polymerization of Ethylene", Macromolecules, vol. 26, 1993, pp. 1180–1182.

* cited by examiner

Primary Examiner—Veronica P. Hoke

(57) ABSTRACT

The invention includes a process for inhibiting deterioration in an olefin polymer by adding a phenolic free radical inhibitor during or before polymerization with a metallocene type transition metal catalyst without inactivating the free radical inhibitor because does not inhibit the transition metal catalyst activity. Preferably the free radical inhibitor is first to remove compounds which inhibit catalyst activity. The invention also includes a composition comprising at least one olefin monomer, a polymer of the monomer, a metallocene type transition metal catalyst and at least one free radical inhibitor having sufficient substituents to hinder the active inhibiting group such that it does not undesirably inhibit the transition metal catalyst.

25 Claims, No Drawings

INCORPORATION OF FREE RADICAL INHIBITORS IN POLYOLEFINS

This application claims the benefit under 35 USC 119 for provisional application Ser. No. 60/025,430 filed Sep. 4, 1996.

This invention relates to olefin polymerization, more specifically polymerization of olefins using transition metal catalysts; the invention also relates to stabilization of polyolefins especially using free radical inhibitors.

BACKGROUND OF THE INVENTION

Transition metal catalysts include Ziegler type catalysts which are well known to those skilled in the art and metallocene catalysts which are also known to those skilled in the art of polymerizing olefins. Inhibitors, particularly free radical inhibitors, are often added to polyolefins after polymerization using such catalysts to prevent or lessen deterioration caused by free radicals. Addition of free radical inhibitors has followed polymerization to avoid inhibition of the transition metal catalysts. Phenolic compounds are recognized free radical inhibitors but are also believed by those skilled in the art to inhibit transition metal polymerization catalysts.

It would be useful to also avoid free radical induced deterioration during polymerization, preferably without substantially inhibiting transition metal catalysts. Inhibitors added before or during polymerization would advantageously reduce deterioration of the polymer by free radicals during processes that often precede inhibitor addition. Additionally, inhibitor addition during or before polymerization would advantageously result in good mixing and avoid processing steps such as melting formed polymer, a step now needed for good inhibitor addition. In some processes the inhibitor is added in solution and mixing as well as solvent removal, is needed; both would advantageously be avoided by addition of inhibitor before or during polymerization.

In previous attempts to add inhibitors to polymers before or during polymerization, whether or not the inhibitors were monomers to be incorporated into the polymer, the active groups of the inhibitors were inactivated, for instance by reaction with aluminum reagent, for instance diethylaluminum chloride. See EP 466,263 (Olivier and Young) 1992. Inactivation of the inhibitor is disadvantageous in that the inhibitor is not active to avoid deterioration from free radicals, and in that extra process steps and reagents are required for inactivation and removal of the inactivating species. In addition to the costs associated with extra reagents and extra steps, removal often requires acid (as in the case of aluminum compound inactivators) which itself can be detrimental to a polymer, especially in its subsequent uses.

It would be desirable to have a method of inhibiting deterioration in a polymer by adding an inhibitor during or before polymerization with a transition metal catalyst without inactivating the inhibitor or reacting it with one or more substances that reduce its activity with the catalyst.

SUMMARY OF THE INVENTION

It has now been found that certain phenolic compounds can be used as free radical inhibitors during polymerization without deactivation of transition metal catalysts. Use of such compounds during polymerization is particularly advantageous when the inhibitors and/or the resulting mixture with monomer and catalyst are substantially free of catalyst inactivating compounds such as less substituted phenols and quinones and when the transition metal catalysts are activated with compounds which do not react with the inhibitors, especially non-aluminum compounds.

The invention includes a process for inhibiting deterioration in a polymer by admixing an inhibitor with at least one olefin monomer during or before polymerization thereof using a transition metal catalyst. It is not necessary or desirable to inactivate the inhibitor or react it with one or more substances that reduce its activity with the catalyst. The process is preferably preceded by a step of purifying the inhibitor to remove compounds which inhibit catalyst activity such as quinones and phenols which are not sufficiently sterically hindered to avoid inhibiting the catalyst.

Additionally, the invention includes a composition comprising at least one olefin monomer, a polymer of the monomer, a transition metal catalyst and at least one inhibitor having sufficient substituents to hinder the active inhibiting group such that it does not undesirably inhibit the transition metal catalyst. The inhibitor is preferably purified such that compounds which inhibit the catalyst are substantially removed. Preferably neither the monomer(s) nor catalyst contain such compounds. The invention is particularly useful when the monomer comprises propylene, styrene or a derivative of either.

DETAILED DESCRIPTION OF THE INVENTION

Inhibitors useful in the practice of the invention are those having at least one active group capable of inhibiting free radicals and having sufficient substitution to hinder each active group such that it does not undesirably inhibit a transition metal catalyst. Those skilled in the art recognize that some catalyst inhibition may be acceptable however, advantageously, in the practice of the invention only limited catalysts inhibition takes place preferably less than about 75 percent, more preferably less than about 50 percent, most preferably less than about 25 percent of the catalyst is inhibited by the free radical inhibitors used in the practice of the invention. Those skilled in the art recognize that the amount of inhibition is a function of the molar ratio of free radical inhibitor to catalyst. For instance at a ratio of 10000:1, 25 to 75 percent inhibition is sometimes observed. However, in the case of a molar ratio of free radical inhibitor to catalyst of about 1:1, there is preferably less than about 10 percent reduction in catalyst activity measured by monomer converted to polymer per unit time.

Each active group on the inhibitor is suitably any group active in inhibiting free radicals, preferably an active hydrogen group, XH where X is a heteroatom such as oxygen, nitrogen (R'''N where R''' is any hydrocarbyl group or silyl group (such as trimethylsilyl, triethylsilyl, or $H_3Si$)) or sulfur, preferably oxygen. R''' preferably has from 1 to about 50 carbon atoms and optionally from 1 to about 5 silicon atoms. More preferably the active group is a hydroxyl (including phenol) group, amine, or sulfhydryl, most preferably a hydroxyl group. Those skilled in the art recognize the molecular structures which demonstrate high activity in inhibiting free radicals. For instance, the active group is preferably attached to an aromatic ring, most preferably is a phenol group.

To achieve sufficient steric hindrance to avoid undesirably inhibiting a transition metal catalyst, the inhibitor preferably has at least one hindering group on each carbon adjacent to an active group. Hindering groups are groups sufficiently large to hinder access of a transition metal catalyst to the active inhibiting group and advantageously comprise at least about 3 carbon atoms, preferably at least about 4 carbon atoms. The hindering groups are preferably branched such as isopropyl, tertiary butyl, isobutyl, isopentyl, styryl (—CH$_2$—CH$_2$—C$_6$H$_5$) groups and the like. The groups are preferably hydrocarbyl groups or substituted with additional active inhibiting groups which are also sufficiently sterically hindered to avoid inhibiting a transition metal catalyst, but optionally may have other inert substitution such as ethers or trisubstituted amine groups. Inert substitution means substitution which does not undesirably interfere with the action of the active group(s) or with transition metal catalysis of polymerization. The hindering groups are preferably selected from tertiary butyl groups or styryl groups, optionally and preferably further substituted with at least one additional active inhibiting group which is in turn sterically hindered. The preferred styryl group is 1-hydroxy, 2-methylene, 4-methyl, 6-tertiary butyl phenyl, hereinafter referred to as active styryl.

The inhibitors are preferably of the formula:

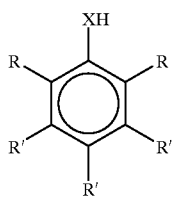

wherein XH is an active group as previously described; and R is independently a hindering group as previously described; and each R' is independently hydrogen or any inert substitution, preferably selected from hydrogen, methyl, or R, more preferably selected from hydrogen, methyl, tertiary butyl, or styryl, most preferably wherein the styryl group is active styryl.

Specific examples include:

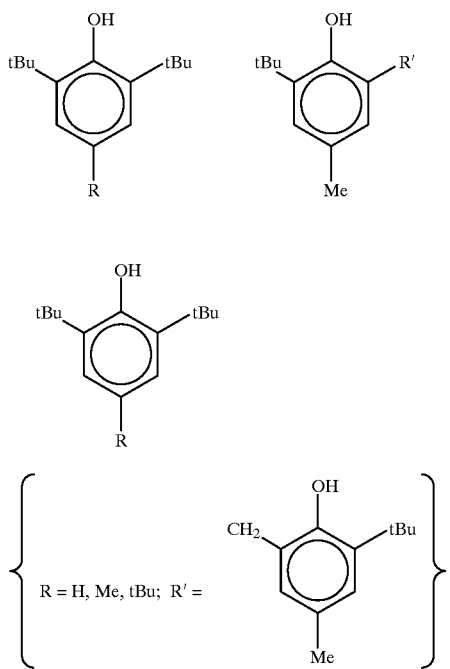

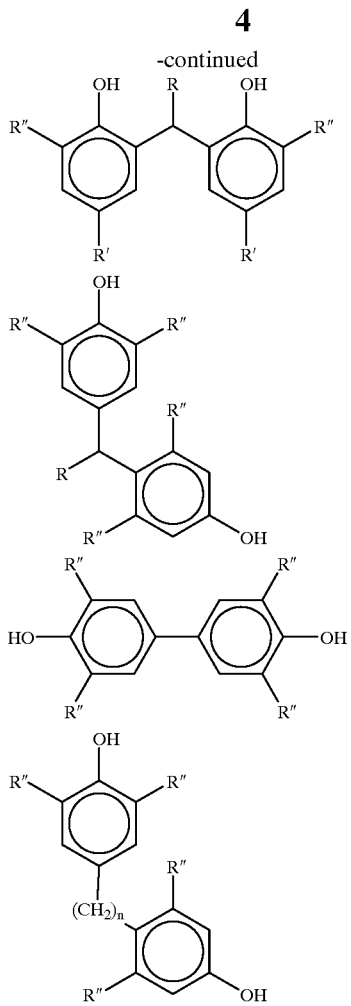

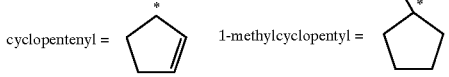

R and R' = aromatic or aliphatic radical
R" = bulky aliphatic group such as isopropyl, t-butyl, sec-butyl, styrenyl (-CHMePh), cumyl (-CMe$_2$Ph), cyclopentenyl, 1-methylcyclopentyl cyclopentenyl = [structure]    1-methylcyclopentyl = [structure]

where * = binding site

The inhibitors are compounds commercially available, known to those skilled in the art or can be prepared by means within the skill in the art such as the process reported in Ullmann's Encyclopedia of Industrial Chem., W. Gerhartz ed., 5th edition, VCH publisher, pp. 197–199, Vol. A-1, 1985; ibid Vol. A19, pp 3288–340.

To avoid undesirable inhibition of the transition metal catalyst, compounds which inhibit the catalyst, particularly, compounds having active groups not sufficiently sterically hindered to avoid such inhibition are preferably removed from the inhibitor. That is, while it may not be practical to remove every molecule of such compounds, they are sufficiently absent to avoid undesirable inhibition of the transition metal catalyst, preferably concentration of such compounds is less than about 5.0 weight percent, more preferably less than about 1.0 weight percent, most preferably less than 0.5 weight percent. Compounds to be removed include those having insufficiently hindered oxygen-containing groups such as hydroxyl (including phenol) groups, ketones, aldehydes, aliphatic, alcohols and quinones, and most preferably also include those catalyst-inhibiting compounds having amine groups.

Removal of such compounds is within the skill in the art as by the use of distillation, sublimation, crystallization, partitioning between immiscible solvents, precipitation, chromatography, and passage of solutions of the antioxidant through beds of adsorptive solids (such as silica gel, alumina, clays, zeolites, activated carbon, crosslinked polymeric beads, and the like). The use of adsorbent beds is particularly useful for several reasons. The polar impurities in the antioxidant which are most deleterious to the metal catalyst adsorb most strongly, and allow the relatively nonpolar antioxidant to pass through. The column is optionally regenerated or replaced when the adsorptive capacity has been reached. Another advantage of adsorptive beds is that this purification method is often already installed in manufacturing facilities as a means to purify solvents and/or monomers.

Practice of the invention is applicable to polyolefins, that is polymers comprising units derived from olefin monomers (that is monomers containing at least one double bond), hereinafter also Hydrocarbon Olefin Monomers), preferably alpha olefins and cycloalkenes, more preferably wherein the olefin(s) comprise styrene or propylene or a derivative of either.

The process of the invention is applicable to polymerization of any olefin monomer or combination thereof. Preferred monomers include alpha-olefins having from 2 to 20,000, preferably from 2 to 20, more preferably from 2 to 8 carbon atoms and combinations of two or more of such alpha-olefins. Particularly suitable alpha-olefins include, for example, styrene, alpha-methyl styrene, ethylene, propylene, 1-butene, 1-pentene, 4-methyl-1-pentene, 1-hexene, 1-heptene, 1-octene, 1-nonene, 1-decene, 1-undecene, 1-dodecene, 1-tridecene, 1-tetradecene, 1-pentadecene, or combinations thereof, as well as long chain vinyl terminated oligomeric or polymeric reaction products formed during the polymerization, and optionally C10–30 -olefins specifically added to the reaction mixture in order to produce relatively long chain branches in the resulting polymers. Preferably, the alpha-olefins are styrene or derivatives thereof ethylene, propene, 1-butene, 4-methyl-1-pentene, 1-hexene, 1-octene, and combinations of ethylene and/or propene with one or more of such other alpha-olefins. Other preferred monomers include styrene, halo- or alkyl substituted styrenes, tetrafluoroethylene, vinylcyclobutene, 1,4-hexadiene, dicyclopentadiene, ethylidene norbornene, and 1,7-octadiene. Mixtures of the above-mentioned monomers may also be employed.

The process of the invention is particularly useful when the monomers comprise styrene or a substituted styrene. It is particularly important to inhibit free radicals in a process of polymerizing styrene using transition metal catalysts, especially metallocene catalysts, because such catalysts produce a desirable stereoregular, e.g. syndiotactic polystyrene, but free radicals produce atactic polystyrene which is preferably avoided in the production of stereoregular polystyrene. In forming stereoregular polystyrene, the styrene is preferably purified to remove oxygen-containing compounds which inhibit the catalyst; then the styrene is optionally and conveniently stored. Use of an inhibitor in these early stages to avoid free radical polymerization of the purified styrene which is known to be particularly susceptible to free radical polymerization is very advantageous, but is avoided in current practice because removal of free radical inhibitors which also inhibit or are believed to inhibit transition metal catalysts would be required. Another advantage of adding a free radical inhibitor to styrene before or during transition metal catalyzed polymerization is to avoid free radical polymerization of styrene monomer remaining in the stereoregular polystyrene.

Similarly the process of the invention is particularly useful when the monomer comprises propylene because polypropylene is especially susceptible to molecular weight degradation from the action of free radicals.

The inhibitor is used in any quantity effective to accomplish the desired purpose of improved thermal stability (functioning as an antioxidant or free radical inhibitor). Those skilled in the art recognize that the optimum amount of inhibitor is a function of the polymer and the conditions to which it will be exposed The amount is often at least about 10 ppm and is usually not more than about 50,000 ppm (5 weight percent) advantageously, with a preferred range from about 100 ppm to about 5,000 ppm The process of the invention is applicable to use of any transition metal catalyst including Ziegler-type catalysts and metallocene-type catalysts, both of which are well known within the skill in the art. For reasons explained subsequently, preferred catalysts are activated with compounds not reactive with the inhibitors, preferably with non-aluminum catalysts. For that reason, metallocene-type catalysts are preferred.

Practice of the invention is particularly useful with any transition metal metallocene catalyst within the skill in the art. Specific metallocene catalysts known in the art are discussed in such references as EPA Nos. 485,820; 485,821; 485,822; 485,823; 518,092; and 519,237; U.S. Pat. Nos. 5,145,819; 5,296,434, all hereby incorporated herein by reference in their entireties.

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Advantageous catalysts for use herein are derivatives of any transition metal including Lanthanides, but preferably of Group 3, 4, or Lanthanide metals which are in the +2, +3, or +4 formal oxidation state. Preferred compounds include metal complexes containing from 1 to 3 $\pi$-bonded anionic or neutral ligand groups, which are optionally cyclic or non-cyclic delocalized $\pi$-bonded anionic ligand groups. Exemplary of such $\pi$-bonded anionic ligand groups are conjugated or nonconjugated, cyclic or non-cyclic dienyl groups, and allyl groups. By the term "$\pi$-bonded" is meant that the ligand group is bonded to the transition metal by means of its delocalized $\pi$-electrons.

Each atom in the delocalized $\pi$-bonded group is optionally independently substituted with a radical selected from the group consisting of hydrogen, halogen, hydrocarbyl, halohydrocarbyl, hydrocarbyl-substituted metalloid radicals wherein the metalloid is selected from Group 14 of the Periodic Table of the Elements, and such hydrocarbyl- or hydrocarbyl-substituted metalloid radicals further substituted with a Group 15 or 16 hetero atom containing moiety. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. In addition two or more such adjacent radicals may together form a fused ring system, a hydrogenated fused ring system, or a metallocycle with the metal. Suitable hydrocarbyl-substituted organometalloid radicals include mono-, di- and tri-substituted organometalloid radicals of Group 14 elements wherein each of the hydrocarbyl groups contains from 1 to 20 carbon atoms. Examples of advantageous hydrocarbyl-substituted organometalloid radicals include trimethylsilyl, triethylsilyl, ethyldimethylsilyl, methyldiethylsilyl, triphehylgermyl, and trimethylgermyl groups. Examples of Group 15 or 16 hetero atom containing moieties include amine, phosphine, ether or thioether moieties or monovalent derivatives thereof, e. g. amide, phosphide, ether or thioether groups bonded to the transition metal or Lanthanide metal, and bonded to the hydrocarbyl group or to the hydrocarbyl-substituted metalloid containing group.

Examples of advantageous anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, and decahydroanthracenyl groups, as well as $C_{1-10}$ hydrocarbyl-substituted or $C_{1-10}$ hydrocarbyl-substituted silyl substituted derivatives thereof. Preferred anionic delocalized n-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, and tetrahydroindenyl.

A preferred class of catalysts are transition metal complexes corresponding to the Formula A:

$$L_lMX_mX'_nX''_p, \text{ or a dimer thereof}$$

wherein:

L is an anionic, delocalized, π-bonded group that is bound to M, containing up to 50 non-hydrogen atoms, optionally two L groups may be joined together forming a bridged structure, and further optionally one L is bound to X;

M is a metal of Group 4 of the Periodic Table of the Elements in the +2, +3 or +4 formal oxidation state;

X is an optional, divalent substituent of up to 50 non-hydrogen atoms that together with L forms a metallocycle with M;

X' at each occurrence is an optional neutral Lewis base having up to 20 non-hydrogen atoms and optionally one X' and one L may be joined together;

X" each occurrence is a monovalent, anionic moiety having up to 40 non-hydrogen atoms, optionally, two X" groups are covalently bound together forming a divalent dianionic moiety having both valences bound to M, or, optionally 2 X" groups are covalently bound together to form a neutral, conjugated or nonconjugated diene that is π-bonded to M (whereupon M is in the +2 oxidation state), or further optionally one or more X" and one or more X' groups are bonded together thereby forming a moiety that is both covalently bound to M and coordinated thereto by means of Lewis base functionality;

l is 0, 1 or 2;

m is 0 or 1;

n is a number from 0 to 3;

p is an integer from 0 to 3; and the sum, l+m+p, is equal to the formal oxidation state of M, except when 2 X" groups together form a neutral conjugated or non-conjugated diene that is π-bonded to M, in which case the sum l+m is equal to the formal oxidation state of M.

Preferred complexes include those containing either one or two L groups. The latter complexes include those containing a bridging group linking the two L groups. Preferred bridging groups are those corresponding to the formula $(ER^*_2)_x$ wherein E is silicon, germanium, tin, or carbon, R* independently each occurrence is hydrogen or a group selected from silyl, hydrocarbyl, hydrocarbyloxy and combinations thereof, said R* having up to 30 carbon or silicon atoms, and x is 1 to 8. Preferably, R* independently each occurrence is methyl, ethyl, propyl, benzyl, tert-butyl, phenyl, methoxy, ethoxy or phenoxy.

Examples of the complexes containing two L groups are compounds corresponding to the formula:

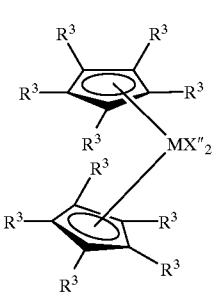

(AI)

or

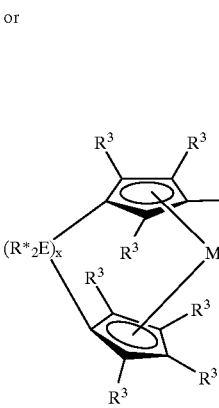

(AII)

wherein:

M is titanium, zirconium or hafnium, preferably zirconium or hafnium, in the +2 or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (e.g., a hydrocarbadiyl, germadiyl group) thereby forming a fused ring system, and X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms forming a complex with M, whereupon M is in the +2 formal oxidation state, and R*, E and x are as previously defined.

A further example of a preferred class of coordination complexes useful in the practice of the present invention corresponds to Formula AIV:

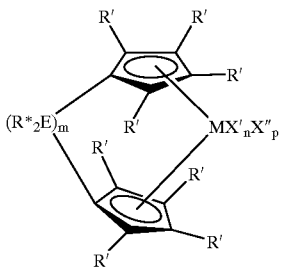

wherein:
M is titanium, zirconium or hafnium, in the +2, +3, or +4 formal oxidation state;
E independently each occurrence is carbon or silicon;
R* independently each occurrence is selected from the group consisting of $C_{1-6}$ hydrocarbyl, and $C_{1-6}$ hydrocarbyloxy, with the proviso that in at least one occurrence R* is $C_{1-6}$ hydrocarbyloxy;
m is 1 or 2;
R' independently in each occurrence is selected from the group consisting of hydrogen, hydrocarbyl, silyl, germyl, cyano, halo and combinations thereof, said R' having up to about 20 non-hydrogen atoms each, or adjacent R' groups together form a divalent derivative that is a hydrocarbadiyl, siladiyl or germadiyl group;
X' is a conjugated diene having from about 4 to about 30 non-hydrogen atoms, which forms a π-complex with M when M is in the +2 formal oxidation state, whereupon n is 1 and p is 0;
X" each occurrence is an anionic ligand group that is covalently bonded to M when M is in the +3 or +4 formal oxidation state, whereupon n is 0 and p is 1 or 2, and optionally two X" groups together for a divalent anionic ligand group.

The foregoing metal complexes are especially suited for the preparation of polymers having stereoregular molecular structure. In such capacity it is preferred that the complex possesses $C_s$ symmetry or possesses a chiral, stereorigid structure. Examples of the first type are compounds possessing different delocalized π-bonded systems, such as one cyclopentadienyl group and one fluorenyl group. Similar systems based on Ti(IV) or Zr(IV) were disclosed for preparation of syndiotactic olefin polymers in Ewen, et al., J. Am. Chem. Soc. 110, 6255–6256 (1980). Examples of chiral structures include rac bis-indenyl complexes. Similar systems based on Ti(IV) or Zr(IV) were disclosed for preparation of isotactic olefin polymers in Wild et al., J. Organomet. Chem., 232, 233–47, (1982).

Exemplary bridged ligands containing two π-bonded groups are: (dimethylsilyl-bis(cyclopentadienyl)), (dimethylsilyl-bis(methylcyclopentadienyl)), (dimethylsilyl-bis(ethylcyclopentadienyl)), (dimethylsilyl-bis(t-butylcyclopentadienyl)), (dimethylsilyl-bis(tetramethylcyclopentadienyl)), (dimethylsilyl-bis(indenyl)), (dimethylsilyl-bis(tetrahydroindenyl)), (dimethylsilyl-bis(fluorenyl)), (dimethylsilyl-bis(tetrahydrofluorenyl)), (dimethylsilyl-bis(2-methyl-4-phenylindenyl)), (dimethylsilyl-bis(2-methylindenyl)), (dimethylsilyl-cyclopentadienyl-fluorenyl), (dimethylsilyl-cyclopentadienyl-octahydrofluorenyl), (dimethylsilyl-cyclopentadienyl-tetrahydrofluorenyl), (1,1,2,2-tetramethyl-1,2-disilyl-bis-cyclopentadienyl), (1,2-bis(cyclopentadienyl)ethane, and (isopropylidene-cyclopentadienyl-fluorenyl).

Preferred X" groups are selected from hydride, hydrocarbyl, silyl, germyl, halohydrocarbyl, halosilyl, silylhydrocarbyl and aminohydrocarbyl groups, or two X" groups together form a divalent derivative of a conjugated diene or else together they form a neutral, π-bonded, conjugated diene. Most preferred X" groups are $C_{1-20}$ hydrocarbyl groups, including those optionally formed from two X" groups together.

A further class of metal complexes utilized in the present invention corresponds to the preceding formula
$L_lMX_mX'_nX"_p$, or a dimer thereof, wherein X is a divalent substituent of up to 50 non-hydrogen atoms that together with L forms a metallocycle with M.

Preferred divalent X substituents include groups containing up to 30 non-hydrogen atoms comprising at least one atom that is oxygen, sulfur, boron or a member of Group 14 of the Periodic Table of the Elements directly attached to the delocalized π-bonded group, and a different atom, selected from the group consisting of nitrogen, phosphorus, oxygen or sulfur that is covalently bonded to M.

A preferred class of such Group 4 metal coordination complexes used according to the present invention corresponds to the formula:

(AIII)

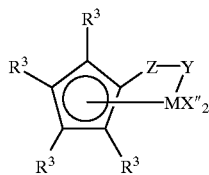

wherein:
M is titanium, zirconium or hafnium in the +2, +3 or +4 formal oxidation state;
X" and $R^3$ are as previously defined for formulas AI and AII;
Y is —O—, —S—, —NR*—, —NR*$_2$—, or —PR*—; and
Z is SiR*$_2$, CR*$_2$, SiR*$_2$SiR*$_2$, CR*$_2$CR*$_2$, CR*=CR*, CR*$_2$SiR*$_2$, or GeR*$_2$, wherein R* is as previously defined.

Illustrative Group 4 metal complexes that may be employed in the practice of the present invention include:
cyclopentadienyltitaniumtrimethyl,
cyclopentadienyltitaniumtriethyl,
cyclopentadienyltitaniumtriisopropyl,
cyclopentadienyltitaniumtriphenyl,
cyclopentadienyltitaniumtribenzyl,
cyclopentadienyltitanium-2,4-dimethylpentadienyl,
cyclopentadienyltitanium-2,4-dimethylpentadienyltriethylphosphine,
cyclopentadienyltitanium-2,4-dimethylpentadienyltrimethylphosphine,
cyclopentadienyltitaniumdimethylmethoxide,
cyclopentadienyltitaniumdimethylchloride,
pentamethylcyclopentadienyltitaniumtrimethyl,
indenyltitaniumtrimethyl, indenyltitaniumtriethyl,
indenyltitaniumtripropyl, indenyltitaniumtriphenyl,
tetrahydroindenyltitaniumtribenzyl,
pentamethylcyclopentadienyltitaniumtriisopropyl, pentamethylcyclopentadienyltitaniumtribenzyl, pentamethylcyclopentadienyltitaniumdimethylmethoxide, pentamethylcyclopentadienyltitaniumdimethylchloride, bis(η5-2,4-dimethylpentadienyl)titanium, bis(η5-2,4-dimethylpentadienyl)titaniumtrimethylphosphine, bis(η5-2,4-dimethylpentadienyl)titaniumtriethylphosphine, octahydrofluorenyltitaniumtrimethyl, tetrahydroindenyltitaniumtrimethyl, tetrahydrofluorenyltitaniumtrimethyl, (tert-butylamido)(1,1-dimethyl-2,3,4,9,10--1,4,η5,6,7,8-hexahydronaphthalenyl)dimethylsilanetitaniumdimethyl, (tert-butylamido)(1,1,2,3-tetramethyl-2,3,4,9,10--1,4,5,6,7,8-hexahydronaphthalenyl)dimethylsilanetitaniumdimethyl, (tert-butylamido)(tetramethyl-η5-cyclopentadienyl)dimethylsilanetitanium dibenzyl, (tert-butylamido)(tetramethyl-η5-cyclopentadienyl)dimethylsilanetitanium dimethyl, (tert-butylamido)(tetramethyl-η5-cyclopentadienyl)-1,2-ethanediyltitanium dimethyl, (tert-butylamido)(tetramethyl-η5-indenyl)dimethylsilanetitanium dimethyl, (tert-butylamido)(tetramethyl-η5-cyclopentadienyl)dimethylsilane titanium (III) 2-(dimethylamino)benzyl;

(tert-butylamido)(tetramethyl-η5-cyclopentadienyl)dimethylsilanetitanium (III) allyl; (tert-butylamido)(tetramethyl-η5-cyclopentadienyl)dimethylsilanetitanium (III) 2,4-dimethylpentadienyl; (tert-butylamido)(tetramethyl-η5-cyclopentadienyl)dimethyl-silanetitanium (II) 1,4-diphenyl-1,3-butadiene;

(tert-butylamido)(tetramethyl-η5-cyclopentadienyl)dimethyl-silanetitanium (II) 1,3-pentadiene; (tert-butylamido)(2-methylindenyl)dimethylsilanetitanium (II) 1,4-diphenyl-1,3-butadiene; (tert-butylamido)(2-methylindenyl)dimethylsilanetitanium (II) 2,4-hexadiene; (tert-butylamido)(2-methylindenyl)dimethylsilanetitanium (IV) 2,3-dimethyl-1,3-butadiene;

(tert-butylamido)(2-methylindenyl)dimethylsilanetitanium (IV) isoprene;

(tert-butylamido)(2-methylindenyl)dimethylsilanetitanium 1,3-butadiene;

(tert-butylamido)(2,3-dimethylindenyl)dimethylsilanetitanium (IV) 2,3-dimethyl-1,3-butadiene; (tert-butylamido)(2,3-dimethylindenyl)dimethylsilanetitanium (IV) isoprene; (tert-butylamido)(2,3-dimethylindenyl)dimethylsilanetitanium (IV) dimethyl; (tert-butylamido)(2,3-dimethylindenyl)dimethylsilanetitanium (IV) dibenzyl; (tert-butylamido)(2,3-dimethylindenyl)dimethylsilanetitanium 1,3-butadiene;(tert-butylamido)(2,3-dimethylindenyl)dimethylsilanetitanium (II) 1,3-pentadiene;

(tert-butylamido)(2,3-dimethylindenyl)dimethylsilanetitanium (II) 1,4-diphenyl-1,3-butadiene; (tert-butylamido)(2-methylindenyl)dimethylsilanetitanium (II) 1,3-pentadiene;(tert-butylamido)(2-methylindenyl)dimethylsilanetitanium (IV) dimethyl; (tert-butylamido)(2-methylindenyl)dimethylsilanetitanium (IV) dibenzyl; (tert-butylamido)(2-methyl-4-phenylindenyl)dimethylsilanetitanium (II) 1,3-butadiene, (tert-butylamido)(2-methyl-4-phenylindenyl)dimethylsilanetitanium (II) 1,3-pentadiene, (tert-butylamido)(2-methyl-4-phenylindenyl)dimethylsilanetitanium (II) 2,4-hexadiene, (tert-butylamidoy)(tetramethyl-η5-cyclopentadienyl)dimethyl-silanetitanium 1,3-butadiene, (tert-butylamido)(tetramethyl-η5-cyclopentadienyl)dimethyl-silanetitanium (IV) 2,3-dimethyl-1,3-butadiene, (tert-butylamido)(tetramethyl-η5-cyclopentadienyl)dimethyl-silanetitanium (IV) isoprene, (tert-butylamido)(tetramethyl-η5-cyclopentadienyl)dimethyl-silanetitanium (II) 1,4-dibenzyl-1,3-butadiene, (tert-butylamido)(tetramethyl-η5-cyclopentadienyl)dimethyl-silanetitanium (II) 2,4-hexadiene, (tert-butylamido)(tetramethyl-η5-cyclopentadienyl)dimethyl-silanetitanium (II) 3-methyl-1,3-pentadiene, (tert-butylamido)(2,4-dimethylpentadien-3-yl)dimethyl-silanetitaniumdimethyl, (tert-butylamido)(6,6-dimethylcyclohexadienyl)dimethyl-silanetitaniumdimethyl, (tert-butylamido)(1,1-dimethyl-2,3,4,9,10--1,4,5,6,7,8-hexahydronaphthalen-4-yl)dimethylsilanetitaniumdimethyl, (tert-butylamido)(1,1,2,3-tetramethyl-2,3,4,9,10--1,4,5,6,7,8-hexahydronaphthalen-4-yl)dimethylsilanetitaniumdimethyl, (tert-butylamido)(tetramethyl-η5-cyclopentadienyl methylphenyl-silanetitanium (IV) dimethyl, (tert-butylamido)(tetramethyl-η5-cyclopentadienyl methylphenyl-silanetitanium (II) 1,4-diphenyl-1,3-butadiene, 1-(tert-butylamido)-2-(tetramethyl-η5-cyclopentadienyl)ethanediyl-titanium (IV) dimethyl, and 1-(tert-butylamido)-2-(tetramethyl-η5-cyclopentadienyl)ethanediyl-titanium (II) 1,4-diphenyl-1,3-butadiene.

Complexes containing two L groups including bridged complexes suitable for use in the present invention include:

bis(cyclopentadienyl)zirconiumdimethyl, bis(cyclopentadienyl)zirconium dibenzyl, bis(cyclopentadienyl)zirconium methyl benzyl, bis(cyclopentadienyl)zirconium methyl phenyl, bis(cyclopentadienyl)zirconium diphenyl, bis(cyclopentadienyl)titanium-allyl, bis(cyclopentadienyl)zirconium methyl methoxide, bis(cyclopentadienyl)zirconiummethylchloride, bis(pentamethylcyclopentadienyl)zirconiumdimethyl, bis(pentamethylcyclopentadienyl)titaniuni dimethyl, bis(indenyl)zirconiumdimethyl, indenylfluorenylzirconiumdimethyl, bis(indenyl)zirconiummethyl(2-(dimethylamino)benzyl), bis(indenyl)zirconium methyltrimethylsilyl, bis(tetrahydroindenyl)zirconium methyltrimethylsilyl, bis(pentamethylcyclopentadienyl)zirconiummethylbenzyl, bis(pentamethylcyclopentadienyl)zirconiumdibenzyl, bis(pentamethylcyclopentadienyl)zirconium methyl methoxide, bis(pentamethylcyclopentadienyl)zirconiummethylchloride, bis(methylethylcyclopentadienyl)zirconiumdimethyl, bis(butylcyclopentadienyl)zirconium dibenzyl, bis(t-butylcyclopentadienyl)zirconiumdimethyl, bis(ethyltetramethylcyclopentadienyl)zirconiumdimethyl, bis(methylpropylcyclopentadienyl)zirconium dibenzyl, bis(trimethylsilylcyclopentadienyl)zirconium dibenzyl, dimethylsilyl-bis(cyclopentadienyl)zirconiumdimethyl, dimethylsilyl-bis(tetramethylcyclopentadienyl)titanium-(III) allyl, dimethylsilyl-bis(t-butylcyclopentadienyl) zirconiumdichloride, dimethylsilyl-bis(n-butylcyclopentadienyl)zirconiumdichloride, (methylene-bis(tetramethylcyclopentadienyl)titanium (III) 2-(dimethylamino)benzyl, (methylene-bis(n-butylcyclopentadienyl)titanium(III) 2-(dimethylamino) benzyl, dimethylsilyl-bis(indenyl) zirconiumbenzylchloride, dimethylsilyl-bis(2-methylindenyl)zirconiumdimethyl, dimethylsilyl-bis (2-methyl-4-phenylindenyl)zirconiumdimethyl, dimethylsilyl-bis(2-methylindenyl)zirconium (II)-1,4-diphenyl-1,3-butadiene, dimethylsilyl-bis(2-methyl-4-phenylindenyl)zirconium (II) 1,4-diphenyl-1,3-butadiene, dimethylsilyl-bis(tetrahydroindenyl) zirconium(II) 1,4-diphenyl-1,3-butadiene, dimethylsilyl-bis(fluorenyl)zirconiummethylchloride, dimethylsilyl-bis(tetrahydrofluorenyl)zirconium bis (trimethylsilyl), (isopropylidene)(cyclopentadienyl) (fluorenyl)zirconiumdibenzyl, and dimethylsilyl (tetramethylcyclopentadienyl)(fluorenyl)zirconium dimethyl.

Other catalysts, especially catalysts containing other Group 4 metals, will, of course, be apparent to those skilled in the art.

Preferred metallocene species for use in the practice of the present invention include constrained geometry metal complexes, including titanium complexes, and methods for their preparation as are disclosed in U.S. application Ser. No. 545,403, filed Jul. 3, 1990 (EP-A-416,815); U.S. application Ser. No. 967,365, filed Oct. 28, 1992 (EP-A-514,828); and U.S. application Ser. No. 876,268, filed May 1, 1992, (EP-A-520,732), as well as U.S. Pat. No. 5,055,438, U.S. Pat. No. 5,057,475, U.S. Pat. No. 5,096,867, U.S. Pat. No. 5,064,802, U.S. Pat. No. 5,096,867, U.S. Pat. No. 5,132,380, U.S. Pat. No. 5,132,380, U.S. Pat. No. 5,470,993, U.S. Pat. No. 5,486,632 and U.S. Pat. No. 5,132,380, U.S. Pat. No. 5,321,106. The teachings of all the foregoing patents, publications and patent applications is hereby incorporated by reference in their entireties.

Metallocene catalysts are advantageously rendered catalytically active by combination with one or more activating cocatalysts, by use of an activating technique, or a combination thereof. In the practice of the present invention, advantageous cocatalysts are those which do not react with the inhibitors, preferably do not contain aluminum, especially boron-containing cocatalysts within the skill in the art. Among the boron-containing cocatalysts are tri (hydrocarbyl)boron compounds and halogenated derivatives thereof, advantageously having from 1 to about 10 carbons in each hydrocarbyl or halogenated hydrocarbyl group, more especially perfluorinated tri(aryl)boron compounds, and most especially tris(pentafluorophenyl)borane); amine, phosphine, aliphatic alcohol and mercaptan adducts of halogenated tri($C_{1-10}$hydrocarbyl)boron compounds, especially such adducts of perfluorinated tri(aryl)boron compounds. Alternatively, the cocatalyst includes borates such as tetraphenyl borate having as counterions ammonium ions such as are within the skill in the art as illustrated by European Patent EP 672,688 (Canich, Exxon), published Sep. 20, 1995.

Aluminum compounds, especially cocatalysts, are preferably avoided because they react with inhibitors used in the practice of the invention. Such reaction reduces the effectiveness of the inhibitor and requires removal of the aluminum compound from the inhibitor to activate the inhibitor. Strong acids are one type of compound used in aluminum removal, but effective contact with strong acid often involves melting or dissolving product then solvent removal or cooling and comminution of the resulting polymer.

In the practice of the invention, cocatalysts are used in amounts and under conditions within the skill in the art. Their use is applicable to all processes within the skill in the art, including solution, slurry, bulk (especially propylene), and gas phase polymerization processed. Such processes include those fully disclosed in the references cited previously.

The molar ratio of catalyst/cocatalyst or activator employed preferably ranges from about 1:10,000 to about 100:1, more preferably from about 1:5000 to about 10:1, most preferably from about 1:1000 to about 1:1.

The molar ratio of inhibitor to catalyst is preferably at least about 50. More preferably, the molar ratio of inhibitor to catalyst is preferably at least about 100.

When utilizing certain catalysts to polymerize higher α-olefins, especially propylene, it may be desirable to also contact the catalyst/cocatalyst mixture with a small quantity of ethylene or hydrogen (preferably at least one mole of ethylene or hydrogen per mole of metal complex, suitably from 1 to 100,000 moles of ethylene or hydrogen per mole of metal complex). This contacting may occur before, after or simultaneously to contacting with the higher -olefin. If the foregoing Lewis acid activated catalyst compositions are not treated in the foregoing manner, either extremely long induction periods are encountered or no polymerization at all results. The ethylene or hydrogen may be used in a suitably small quantity such that no significant affect on polymer properties is observed.

In most instances, the polymerization advantageously takes place at conditions known in the prior art for Ziegler-Natta or Kaminsky-Sinn type polymerization reactions, i.e., temperatures from 0–250° C. and pressures from atmospheric to 3000 atmospheres. Suspension, solution, slurry, gas phase or high pressure, whether employed in batch or continuous form or under other process conditions, including the recycling of condensed monomers or solvent, is optionally employed. Examples of such processes are well known in the art for example, WO 88/02009-A1 or U.S. Pat. No. 5,084,534, disclose conditions that are advantageously employed with the polymerization catalysts and are incorporated herein by reference in their entireties. A support, especially silica, alumina, or a polymer (especially polytetrafluoroethylene or a polyolefin) is optionally employed, and desirably is employed when the catalysts are used in a gas phase polymerization process. Such supported catalysts are advantageously not affected by the presence of liquid aliphatic or aromatic hydrocarbons such as are optionally present under the use of condensation techniques in a gas phase polymerization process. Methods for the preparation of supported catalysts are disclosed in numerous references, examples of which are U.S. Pat. Nos. 4,808,561, 4,912,075, 5,008,228, 4,914,253, and 5,086,025 and are suitable for the preparation of supported catalysts.

In such a process the reactants and catalysts are optionally added to the solvent sequentially, in any order, or alternatively one or more of the reactants or catalyst system components are premixed with solvent or material preferably miscible therewith, then mixed together or into more solvent optionally containing the other reactants or catalysts. The preferred process parameters are dependent on the monomers used and the polymer desired.

Polymerization of olefins is within the skill in the art. When ethylene is used as a monomer, ethylene is advantageously added to the reaction vessel in an amount to maintain a differential pressure in excess of the combined vapor pressure of the solvent, inhibitor, and optional alpha-olefin. Generally, the polymerization process is carried out with a differential pressure of ethylene of from about 10 to about 1000 psi (70 to 7000 kPa), most preferably from about 40 to about 400 psi (280 to 2800 kPa). The polymerization is then generally conducted at a temperature of from 25 to 200° C., preferably from 50 to 170° C., and most preferably from 70 to 140° C.

When propylene or styrene is a monomer, it is added to the reaction vessel in predetermined amounts to achieve predetermined monomer ratios, optionally in gaseous form using a joint mass flow controller. Alternatively propylene or liquid monomers are added to the reaction vessel in amounts predetermined to result in ratios desired in the final product. They can be added together with the solvent (if any), alpha-olefin and functional comonomer, or alternatively added separately. The pressure in the reactor is a function of the temperature of the reaction mixture and the relative amounts of propylene and/or other monomers used in the reaction. Advantageously, the polymerization process is carried out at a pressure of from about 10 to about 1000 psi (70 to 7000 kPa), most preferably from about 140 to about 170 psi (980 to 1200 kPa). The polymerization is then conducted at a temperature of from 25 to 200° C., preferably from 50 to 100° C., and most preferably from 60 to 80° C.

The process is advantageously continuous, in which case the reactants are added continuously or at intervals and the catalyst and, optionally cocatalyst, are added as needed to maintain reaction.

While one advantage of the process of the invention is the avoidance of aluminum compounds which protect or otherwise react with the inhibitors, e.g. in a 1:1 mole ratio, those skilled in the art will recognize that aluminum compounds still can be advantageously used in very small quantities e.g. to remove (scavenge) water. Thus, while compositions of the invention preferably avoid aluminum in quantities approaching a 1:1 mole ratio with the inhibitors, aluminum compounds are optionally present in incidental quantities, e.g. in amounts corresponding to a mole ratio of inhibitor to aluminum compound of greater than about 50:1, more preferably greater than about 100:1.

Advantageously, because at most incidental amounts of aluminum are used in the process of the invention, the resulting polymers of the invention have little residual aluminum, less than similar polymers produced by processes within the skill in the art. Additionally, because acid treatment is not needed to remove aluminum, there are no ill effects such as degradation and/or residual acid from such a treatment.

Compositions containing the inhibitors, transition metal catalysts and monomers described above are novel, particularly when the aluminum compounds are present in the incidental stated amounts. In the prior art, inhibitors were avoided in the presence of the catalysts because they were believed to inhibit the catalysts. Alternatively, precursors of the inhibitors, e.g. inhibitors reacted with a deactivating composition, e.g. aluminum compounds, were present rather than the inhibitors themselves. Presence of boron-containing cocatalyst or activator compounds is even more novel because it emphasizes a situation in which aluminum compounds that might incidentally protect the inhibitor are not needed, and are preferably avoided.

The following examples are to illustrate this invention and not limit it. Ratios, parts, and percentages are by weight unless otherwise stated. Examples (Ex) of the invention are designated numerically while comparative samples (C.S.) are designated alphabetically and are not examples of the invention.

For proton NMR, 5 mm tubes with polymer sample in $Cl_2CDCDCl_2$ (~5 percent weight/weight) solutions were analyzed at 130° C. probe temperature. Proton NMR was useful for determination of phenolic monomer incorporation. Peaks at 7.0 ppm (singlet for aromatic protons) and at 2.5 ppm (doublet for benzylic methylenes) were present. The latter assignment was confirmed using allylbenzene as a comonomer. Gel permeation chromatography (GPC) was performed using a crosslinked polystyrene column commercially available from Polymer Laboratories under the trade designation PLgel mixed-D column (10 mm inside diameter by 300 mm long) filled with 5 $\mu$m particles. A diode array detector set to 280 nm (4 nm bandwidth) was used in series with a HP 1057 refractive index detector commercially available from Hewlett Packard according to manufacturer's directions. The polymers were dissolved in chloroform (1 percent weight/volume) except where noted. The flow rate was set to 0.5 mL/min, with an injection volume of 25 $\mu$L. The column was calibrated using a broad polystyrene standard ($M_w$ 250,000, $M_n$ 100,000) with the diode array detector set to 254 nm.

Example 1

Preparation and Use of Free Radical Inhibitor During Polymerization

A 10.6 g sample of orange 2,6-di-tert-butylphenol from Aldrich was dissolved in 8 mL isooctane and injected onto a 400 g silica gel column using a low pressure chromatography apparatus commercially available from Biotage. The eluent was 2 percent toluene/hexane, and 1000 mL fractions were taken which were analyzed by gas chromatography. Nearly all of the phenol eluted in the 2nd and 3rd fractions, which were combined and evaporated to give 8.5 g of a viscous, colorless oil. Analysis of the crude starting material and the purified fractions by gas chromatography resulted in the following analysis ("und." Indicates that the peak was undetected with an estimated detection limit of about 0.05 percent).

|  | Retention Times (min) | | | | |
| --- | --- | --- | --- | --- | --- |
|  | 3.35 | 4.21 | 4.80 | 5.16 | 6.10 |
| Crude | 0.23% | 0.68% | 95.50% | 3.30% | 0.54% |
| Fraction 2 | und. | 0.27% | 99.54% | und. | 0.19% |
| Fraction 3 | und. | 0.26% | 99.48 | und. | 0.26% |

The peak at 3.35 minutes was identified as 2-tert-butylphenol, and the peak at 4.80 minutes is 2,6-di-tert-butylpheaol. The other-components are unknown, but are suspected to be isomers of di-tert-butylphenol. The analysis was performed using the following conditions: DB-5 column, 0.53 mm ID, (inside diameter) 3 $\mu$m film thickness, 15 m length, 3 psig (21 kPa) head pressure of helium, cold on-column injection, flame ionization detector, HP5890 gas chromatograph, oven temperatures start at 200° C., hold for 1 min, then ramp at 10° C./min to 270° C., and finally hold for 5 min.

Polymerization Reaction

A two-liter autoclave reactor was' charged with 636 g Isopar-E™ mixed alkanes solvent (commercially available from Exxon Chemicals Inc.) and 150 g propylene. Hydrogen was added as a molecular weight control agent by differential pressure expansion from a 75 mL addition tank at 21.4 psi (1772 kPa). The reactor was heated to 70° C. and 5 mL 2,6-di-tert-butylphenol (purified above, a combination of fractions 2 and 3) was added along with 15 micromoles each of rac ethylidene-bis(indenyl) zirconium dimethyl catalyst and cocatalyst (B(C$_6$F$_5$)$_3$) (both 0.005 M in toluene) which were premixed in the drybox. This solution was then transferred to a catalyst addition tank and injected into the reactor. An additional 3 micromoles each of catalyst and cocatalyst were added to the reactor at 35 minutes into the run. The polymerization conditions were maintained for 44 minutes. The resulting solution was removed from the reactor and dried in a vacuum oven at a maximum temperature of 140° C. for about 15 hours to give 87.9 g of crystalline polymer

We claim:

1. A process for inhibiting deterioration in a polymer comprising admixing an inhibitor of Formula 1:

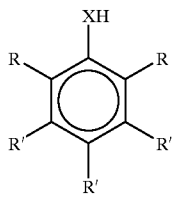

wherein XH is an active hydrogen group; each R is independently an aryl or alkyl hindering group having sufficient atoms to form a sterically hindered XH group, sufficiently hindered to avoid reaction of XH with a transition metal catalyst; and each R' is independently hydrogen or any inert substitution; with at least one olefin monomer, during or before polymerization thereof using a metallocene catalyst having a Group 3, Group 4, or Lanthanide transition metal wherein the mole ratio of inhibitor to any aluminum compounds present is at least about 100:1.

2. The process of claim 1 wherein the inhibitor is added to the monomer(s) before contact thereof with the catalyst.

3. The process of claim 1 wherein the inhibitor is added to the catalyst before contact thereof with the monomer(s).

4. The process of claim 1 wherein the inhibitor is added during contact of the catalyst and monomer(s).

5. The process of claim 1 wherein X is oxygen, sulfur or nitrogen, each R is independently t-butyl or isobutyl, isopropyl, isopentyl or an unsubstituted or actively substituted styryl group; each alkyl group has from 1 to about 5000 carbon atoms, and each aromatic or aryl group has from about 6 to about 100 carbon atoms.

6. The process of claim 5 wherein X is oxygen or nitrogen and each R' is independently H, methyl, t-butyl, or styryl, each of which is optionally inertly substituted.

7. The process of claim 6 wherein X is oxygen.

8. The process of claim 7 wherein the inhibitor is 2,6-di-t-butylphenol.

9. The process of claim 1 wherein the monomer is selected from ethylene, 1-hexene, 1-octene, propylene, styrene and mixtures thereof.

10. The process of claim 9 wherein the monomer comprises styrene, propylene or derivatives of either.

11. The process of claim 1 wherein the transition metal catalyst is (η5-C$_5$Me$_4$)SiMe$_2$(N-tBu)TiMe$_2$).

12. The process of claim 1 wherein the cocatalyst comprises a boron containing compound.

13. The process of claim 12 wherein cocatalyst is B(C$_6$F$_5$)$_3$.

14. The process of claim 12 wherein cocatalyst comprises a borate and an ammonium counterion.

15. The process of claim 1 wherein the molar ratio of inhibitor to catalyst is at least 1000.

16. The process of claim 1 wherein the molar ratio of inhibitor to cocatalyst is at least 1000.

17. The process of claim 1 wherein the molar ratio of inhibitor to catalyst and cocatalyst is at least 1000.

18. The process of claim 1 wherein the amount of inhibitor ranges from 0.001 to 5 weight percent based on weight of the monomers.

19. The process of claim 1 wherein the inhibitor is not inactivated by reaction with an aluminum compound.

20. The process of claim 1 wherein the step of admixing the inhibitor and olefin monomer is preceded by a step of purifying the inhibitor to remove compounds which inhibit catalyst activity.

21. The process of claim 20 wherein the compounds removed are selected from quinones and phenols which are not sufficiently sterically hindered to avoid inhibiting the catalyst.

22. The process of claim 1 wherein the catalyst corresponds to the formula:

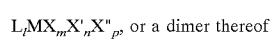

wherein:

L is an anionic, delocalized, π-bonded group that is bound to M, containing up to 50 non-hydrogen atoms, optionally two L groups may be joined together forming a bridged structure, and further optionally one L is bound to X;

M is a metal of Group 4 of the Periodic Table of the Elements in the +2, +3 or +4 formal oxidation state;

X is an optional, divalent substituent of up to 50 non-hydrogen atoms that together with L forms a metallocycle with M;

X' at each occurrence is an optional neutral Lewis base having up to 20 non-hydrogen atoms and optionally one X' and one L may be joined together;

X" each occurrence is a monovalent, anionic moiety having up to 40 non-hydrogen atoms, optionally, two X" groups are covalently bound together forming a divalent dianionic moiety having both valences bound to M, or, optionally 2 X" groups are covalently bound together to form a neutral, conjugated or nonconjugated diene that is π-bonded to M (whereupon M is in the +2 oxidation state), or further optionally one or more X" and one or more X' groups are bonded together thereby forming a moiety that is both covalently bound to M and coordinated thereto by means of Lewis base functionality;

l is 0, 1 or 2;

m is 0 or 1;

n is a number from 0 to 3;

p is an integer from 0 to 3; and the sum, l+m+p, is equal to the formal oxidation state of M, except when 2 X" groups together form a neutral conjugated or non-conjugated diene that is π-bonded to M, in which case the sum l+m is equal to the formal oxidation state of M.

23. The process of claim 22 wherein the catalyst is selected from compounds corresponding to Formula AIII:

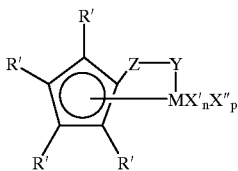

wherein:

M is titanium, zirconium or hafnium, in the +2, +3 or +4 formal oxidation state;

Y is —O—, —S—, —NR*—, —NR*$_2$—, or —PR*—; and

Z is SiR*$_2$, CR*$_2$, SiR*$_2$SiR*$_2$, CR*$_2$CR*$_2$, CR*=CR*, CR*$_2$SiR*$_2$, or GeR*$_2$, wherein R* is as previously defined;

R' independently in each occurrence is selected from the group consisting of hydrogen, hydrocarbyl, silyl, germyl, cyano, halo and combinations thereof, said R' having up to about 20 non-hydrogen atoms each, or adjacent R' groups together form a divalent derivative that is a hydrocarbadiyl, siladiyl or germadiyl group;

X' is a conjugated diene having from about 4 to about 30 non-hydrogen atoms, which forms a π-complex with M when M is in the +2 formal oxidation state, whereupon n is 1 and p is 0;

X" independently each occurrence is an anionic ligand group of up to about 40 non-hydrogen atoms that is covalently bonded to M when M is in the +3 or +4 formal oxidation state, whereupon n is 0 and p is 1 or 2, and optionally two X" groups together for a divalent anionic ligand group, whereupon n is 0; or a dimer, solvated adduct, chelated derivative or mixture thereof;

Formula AI or AII:

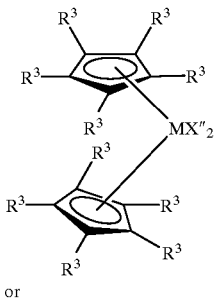

(AI)

or

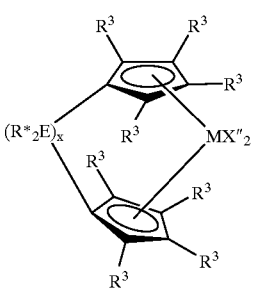

(AII)

wherein:

M is titanium, zirconium or hafnium, in the +2 or +4 formal oxidation state;

R$^3$ in each occurrence independently is selected from the group consisting of hydrogen, hydrocarbyl, silyl, germyl, cyano, halo and combinations thereof, said R$^3$ having up to 20 non-hydrogen atoms, or adjacent R$^3$ groups together form a divalent derivative (e.g., a hydrocarbadiyl, germadiyl group) thereby forming a fused ring system, and X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms forming a complex with M, whereupon M is in the +2 formal oxidation state, and R* independently each occurrence is hydrogen or a group selected from silyl, hydrocarbyl, hydrocarbyloxy and combinations thereof, said R* having up to 30 carbon or silicon atoms, and x is 1 to 8; or Formula AIV:

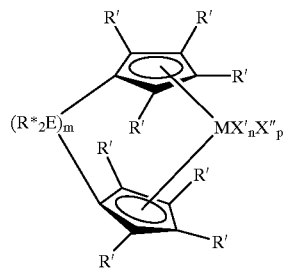

wherein:

M is titanium, zirconium or hafnium, in the +2, +3, or +4 formal oxidation state;

E independently each occurrence is carbon or silicon;

R* independently each occurrence is selected from the group consisting of C$_{1-6}$ hydrocarbyl, and C$_{1-6}$ hydrocarbyloxy, with the proviso that in at least one occurrence R* is C$_{1-6}$ hydrocarbyloxy;

m is 1 or 2;

R' independently in each occurrence is selected from the group consisting of hydrogen, hydrocarbyl, silyl, germyl, cyano, halo and combinations thereof, said R' having up to about 20 non-hydrogen atoms each, or adjacent R' groups together form a divalent derivative that is a hydrocarbadiyl, siladiyl or germadiyl group;

X' is a conjugated diene having from about 4 to about 30 non-hydrogen atoms, which forms a π-complex with M when M is in the +2 formal oxidation state, whereupon n is 1 and p is 0;

X" each occurrence is an anionic ligand group that is covalently bonded to M when M is in the +3 or +4 formal oxidation state, whereupon n is 0 and p is 1 or 2, and optionally two X" groups together for a divalent anionic ligand group.

24. A composition of matter produced by the process of claim 1.

25. An article prepared from a composition of claim 24 which article exhibits greater resistance to free radical deterioration than is exhibited by a polyolefin having the same composition except without the inhibitor.

* * * * *